US010040629B1

(12) United States Patent
Yamagishi (10) Patent No.: US 10,040,629 B1
(45) Date of Patent: Aug. 7, 2018

(54) AUTOMATED STORAGE AND RETRIEVAL SYSTEM FOR PALLETS AND CASES

(71) Applicant: JB-Create, Inc., Ishikawa (JP)

(72) Inventor: Juro Yamagishi, Ishikawa (JP)

(73) Assignee: JB-Create, Inc., Ishikawa (JP)

( * ) Notice: Subject to any disclaimer, the term of this patent is extended or adjusted under 35 U.S.C. 154(b) by 10 days.

(21) Appl. No.: 15/475,255

(22) Filed: Mar. 31, 2017

(30) Foreign Application Priority Data

Jan. 18, 2017 (JP) .................................... 2017-6369

(51) Int. Cl.
*B65G 1/00* (2006.01)
*B65G 1/04* (2006.01)
*B65G 47/91* (2006.01)

(52) U.S. Cl.
CPC ........... *B65G 1/0435* (2013.01); *B65G 47/91* (2013.01)

(58) Field of Classification Search
CPC ............................. B65G 1/0407; B65G 1/0435
See application file for complete search history.

(56) References Cited

U.S. PATENT DOCUMENTS

2015/0098775 A1* 4/2015 Razumov ............. B65G 1/0407
414/282

FOREIGN PATENT DOCUMENTS

| JP | H07-97008 A | 4/1995 |
|---|---|---|
| JP | 3223709 B2 | 10/2001 |
| JP | 2002-104608 A | 4/2002 |
| JP | 3686830 B2 | 8/2005 |
| JP | 2007-305159 A | 11/2007 |
| JP | 2011-162329 A | 8/2011 |

* cited by examiner

*Primary Examiner* — Saul Rodriguez
*Assistant Examiner* — Willie Berry, Jr.
(74) *Attorney, Agent, or Firm* — Nakanishi IP Associates, LLC (57) ABSTRACT

An automated storage and retrieval system for storing and picking a pallet and a case includes: a storage rack; a storage rack with a built-in conveyor that includes a configuration of the storage rack and a conveyor for unloading the case, wherein the conveyor is inserted through the storage rack with a built-in conveyor at a predetermined level; a travel lane; a pallet crane traveling on the travel lane to store or pick the pallet onto or from each shelf board; and a case picking crane traveling on a travel lane identical to the travel lane that lets the pallet crane travel, wherein the case picking crane is provided with two independent transfer units capable of moving on and down and each transfer unit picks one piece of the case placed on the shelf board.

1 Claim, 9 Drawing Sheets

AUTOMATED STORAGE AND RETRIEVAL SYSTEM FOR PALLETS AND CASES

BACKGROUND

Technical Field

The present invention relates to a storage and retrieval system of an automated warehouse that allows a pal let crane and a case picking crane disposed on an identical travel lane at an automated warehouse to cooperatively operate and thereby performs pallet storing and case picking.

Related Art

At many automated warehouses, picking a predetermined number of cases stacked on a pallet involves unloading the entire pallet using a pallet crane and picking the cases. This method is effective for high-volume and low-variety picking, i.e. picking a large number of cases from one pallet at one command.

Because of current Internet physical distribution, most of orders from customers require low-volume and high-variety picking on a one case basis. Unfortunately, the pallet storage method described above does not ensure due productivity in case picking.

An hourly pallet loading and unloading capacity at ordinary automated warehouses is around 30 pallets. If one case is picked from one pallet, these warehouses allow picking of only 30 cases per hour. This poses a cost problem.

As a result, low-volume and high-variety picking entails a method of picking cases by man power from pallets that are stored one by one on a warehouse floor. This method involves a large amount of walking action since workers are required to pick cases by walking between pallets placed all over the warehouse floor. This results in a low picking productivity of around 50 cases per hour. This method also requires large storage space because pallets are not allowed to be stacked in layers.

JP 3223709 B discloses an automated warehouse that was invented in response to the problems described above. The automated warehouse of JP 3223709 B includes a lane specifically designed for a stacker crane (pallet crane) traveling on rails installed between two stationary racks. The stacker crane stores or retrieves a comblike protrusion-fitted container (pallet) stacked with cases. The automated warehouse further includes a picker (case picking crane) for picking cases. The picker is provided on rails that run parallel to the lane and are installed outside the stationary racks. The picker resembles a comblike fork in shape and picks cases in combination with the comblike protrusion-fitted container. This configuration allows the automated warehouse to pick only a necessary number of cases.

SUMMARY

Unfortunately, a configuration of an automated warehouse as disclosed in JP 3223709 B requires large space for one system because a pallet crane and a case picking crane run on their respective rails (lanes). This may be disadvantageous in terms of space to current Internet-intended distribution warehouses and similar warehouses that handle a wide variety of items. Since the comblike protrusion-fitted container (pallet) is indispensable for the automated warehouse, general two-slot pallets for forklifts are not compatible. This causes the need for shifting of cases and the labor for that can be complicated.

It is an object of the present invention to provide an automated storage and retrieval system for pallets and cases in which the system allows a pallet crane and a case picking crane disposed on an identical travel lane at an automated warehouse to cooperatively operate and thereby enables pallet storing and picking as well as case storing and picking in a space-saving and efficient manner.

The present invention has been made to achieve the above-described object, and a first aspect of the present invention is an automated storage and retrieval system for pallets and cases, comprising: a storage rack having a plurality of shelf boards in rows and columns, each of the shelf boards being used for storage of a pallet stacked with at least one case; a storage rack with a built-in conveyor comprising a configuration of the storage rack and a conveyor for unloading a case, the conveyor being inserted through the storage rack with a built-in conveyor at a predetermined level; at least one travel lane for allowing a crane to travel parallel to a gap between the storage rack and the storage rack with a built-in conveyor that are combined side by side; a pallet crane configured to travel on the travel lane and perform tasks including storing the pallet onto any of the shelf boards and picking the pallet from any of the shelf boards; and a case picking crane configured to travel on a lane identical to the travel lane that lets the pallet crane travel, the case picking crane being provided with two independent transfer units capable of moving up and down, and each transfer unit being configured to pick one piece of the case placed on any of the shelf boards, wherein one of the transfer units of the case picking crane ascends or descends to the level of the conveyor and transfers a picked case to the conveyor at the same time when the other transfer unit of the case picking crane travels to a column for a specified shelf board loaded with a case and picks the loaded case.

A second aspect of the present invention is the automated storage and retrieval system for pallets and cases according to claim 1, wherein each of the transfer units comprises: a crawler conveyor for coming into contact with the immediate vicinity of a bottom of the case and transferring the case; and an extendable adsorbable arm provided with one adsorbable head that exerts suction on a side face of the case via air pressure, and each of the transfer units is able to rotate about a vertical axis.

According to an aspect of the present invention, an automated storage and retrieval system for pallets and cases includes a pallet crane and a case picking crane that are disposed on an identical lane. This configuration yields savings in footprint.

The system provides coordination in workings including pallet storing and picking, case picking and the transfer of cases to a conveyor. Thus, while the pallet crane is in pallet storing operation, the case picking crane is allowed to keep picking cases within a range that does not interfere with a movable range for the pallet crane, for example. This leads to a substantial improvement in working efficiency.

One of transfer units of the case picking crane ascends or descends to a level of the conveyor and transfers a picked case to the conveyor at the same time when the other transfer unit of the case picking crane travels to a column for a specified shelf board loaded with a case and picks the loaded case. The transfer units simultaneously perform case picking and the transfer of a picked case to the conveyor. This configuration can shorten picking operation time and substantially improve working efficiency.

If each of the transfer units includes: a crawler conveyor for coming into contact with the immediate vicinity of a bottom of a case and transferring the case; and an extendable adsorbable arm provided with one adsorbable head that exerts suction on a side face of the case via air pressure, and if each of the transfer units is able to rotate about a vertical axis, the case picking crane transfers the case to the transfer unit by extending the single adsorbable arm, exerting suction on the side face of the case via air pressure, and utilizing force produced during shrinkage of the adsorbable arm and frictional force on the crawler conveyor. This configuration entails a small number of parts, provides excellent stability, and enables reliable case transfer. Since the transfer unit is able to rotate about a vertical axis, the case picking crane is allowed to pick a case from a storage rack or a storage rack with a built-in conveyor that are disposed on each side of the case picking crane respectively. This configuration can reduce the number of the necessary conveyors. Furthermore, there is an advantage that if one of the storage racks is equipped with the conveyor, the transfer unit can rotate, enabling case unloading.

DETAILED DESCRIPTION

Figure 1:
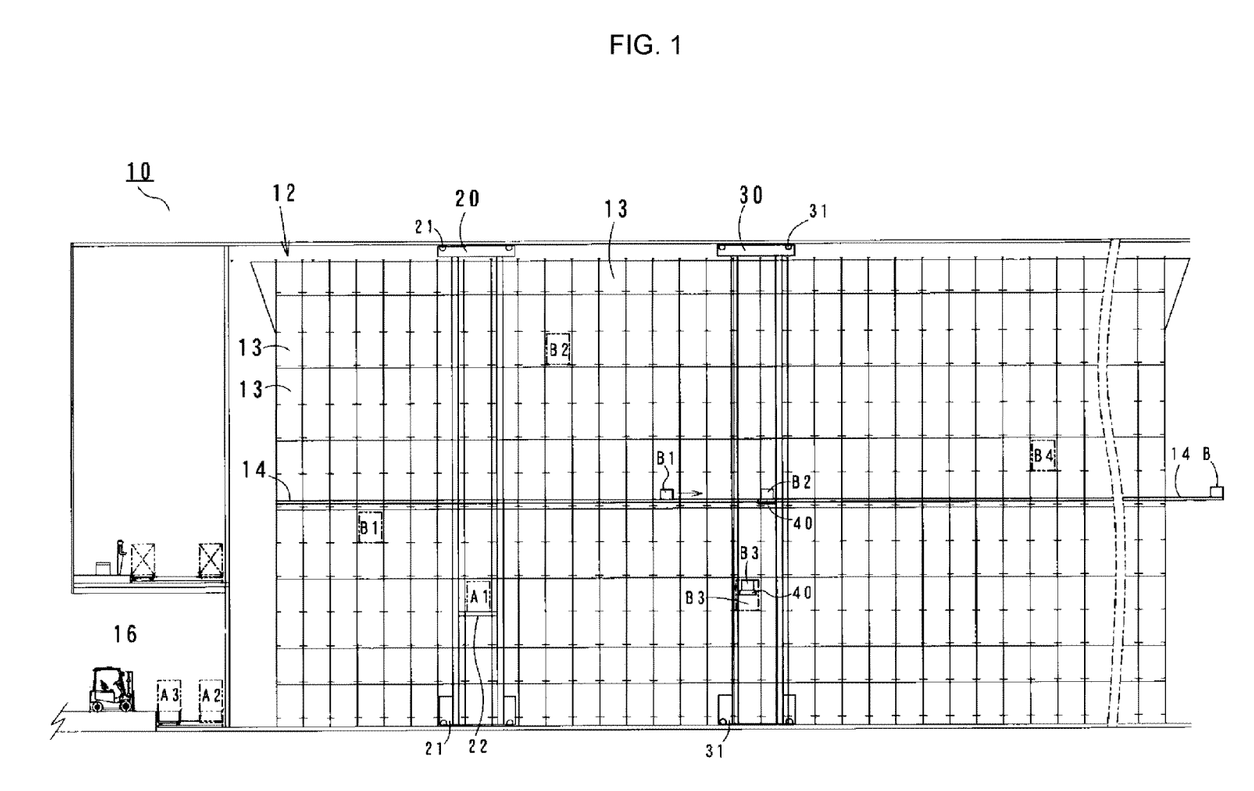
FIG. 1 is a schematic side view of an automated storage and retrieval system for pallets and cases according to an embodiment of the present invention.
Figure 2:
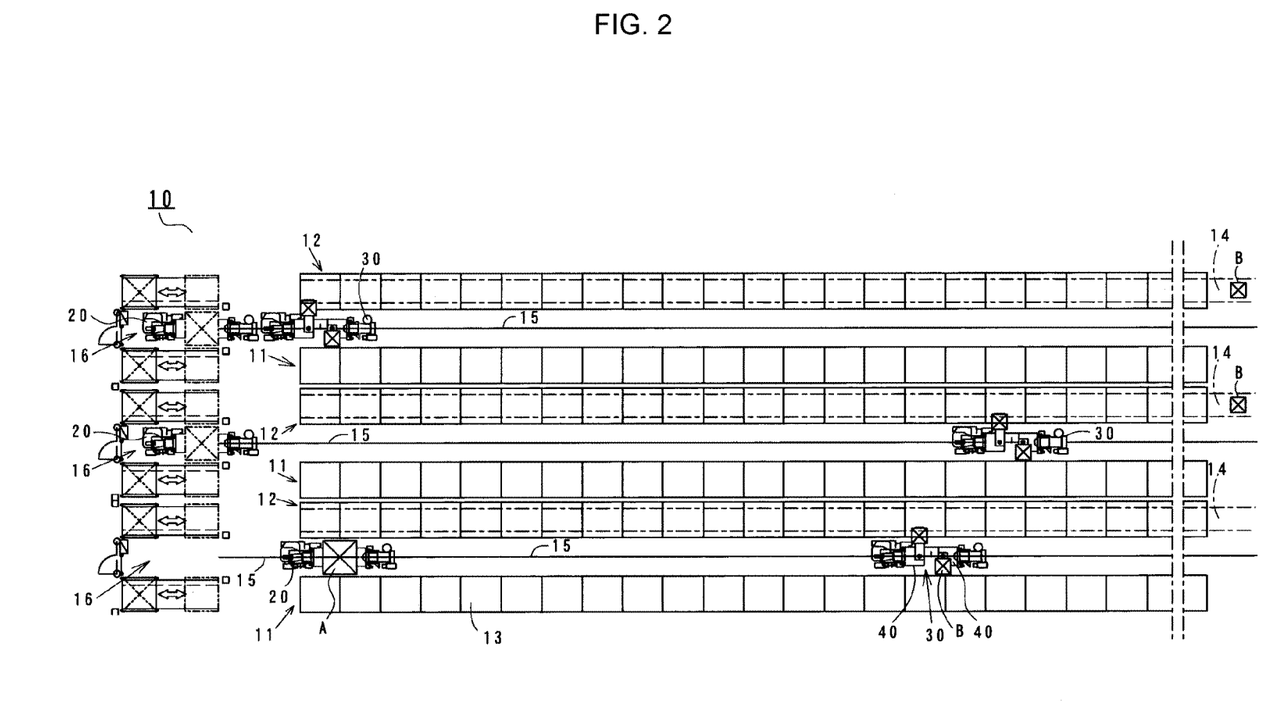
FIG. 2 is a schematic plan view of the automated storage and retrieval system for pallets and cases according to the embodiment of the present invention.
Figure 3A:
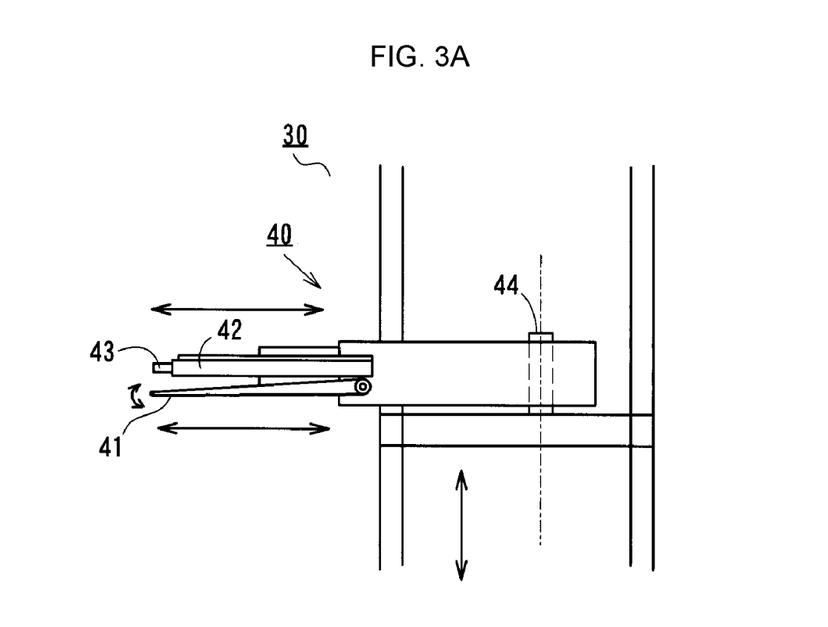
FIGS. 3A and 3B are a schematic elevation view and schematic plan view, respectively, illustrating an embodiment of a case picking crane according to the present invention.
Figure 3B:
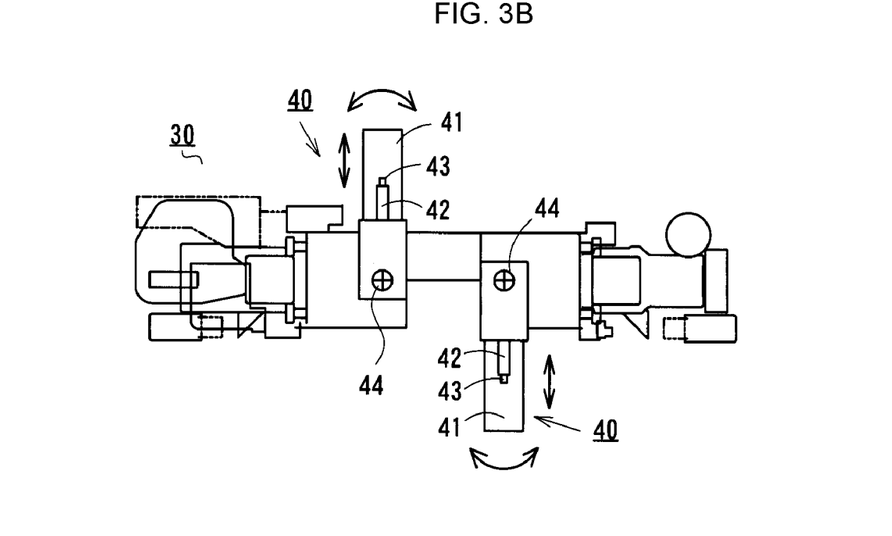

An embodiment of the present invention will now be described in detail with reference to the attached drawings. FIGS. 1 and 2 are a schematic side view and schematic plan view, respectively, illustrating an automated storage and retrieval system for pallets and cases; FIGS. 3A and 3B illustrate an embodiment of a case picking crane according to an embodiment; FIGS. 4A to 4G illustrate example picking motion of the case picking crane; and FIGS. 5A to 5F illustrate example operation of the automated storage and retrieval system for pallets and cases. In this embodiment, a pallet on which cases are stacked is called a pallet for simplicity's sake.

An automated storage and retrieval system 10 for storing and picking a pallet A and a case B includes: a storage rack 11 having a plurality of shelf boards 13 in rows and columns, wherein each of the shelf boards 13 is used for storage of the pallet A stacked with at least one case B; a storage rack with a built-in conveyor 12 that includes a configuration of the storage rack 11 and a conveyor 14 for unloading the case B, wherein the conveyor 14 is inserted through the storage rack with a built-in conveyor 12 at a predetermined level; at least one travel lane 15 for allowing a crane to travel parallel to a gap between the storage rack 11 and the storage rack with a built-in conveyor 12 that are combined side by side; a pallet crane 20 traveling on the travel lane 15 to store or pick the pallet A onto or from each shelf board 13; and a case picking crane 30 traveling on a travel lane identical to the travel lane 15 that lets the pallet crane 20 travel, wherein the case picking crane 30 is provided with two independent transfer units 40 capable of moving up and down and each transfer unit 40 picks one piece of the case B placed on the shelf board 13.

With reference to FIG. 1, the automated storage and retrieval system 10 according to this embodiment disposes the pallet crane 20 on the left and the case picking crane 30 on the right to each other. The case picking crane 30 picks the cases B while moving from a pallet station 16, i.e. a point of origin, toward an endpoint (toward the right in the figure), whereas the pallet crane 20 stores the pallets A onto vacant shelf boards 13 and picks a pallet loaded with a case depending on circumstances while moving inside a movable range from the point of origin to short of the case picking crane 30. These processes of operation are automatically assigned using a computer.

When the case picking crane 30 arrives at the endpoint and then the pallet crane 20 as well reaches the endpoint, the case picking crane and the crane will return to the point of origin without storing nor picking action. This collaborative operation is consecutively performed as one cycle.

With reference to FIG. 2, the case picking crane 30 is allowed to pick cases from racks on both sides, and one of the racks is the storage rack 11, which has no conveyor 14, and the other rack is the storage rack with a built-in conveyor 12. This disposition can reduce the number of the necessary conveyors 14 if any case B picked at the storage rack 11 is transferred to the conveyor 14 built in the storage rack with a built-in conveyor 12. This configuration allows a reduction in installation and running costs, as well as required floor-space.

The pallet crane 20 is equipped with a travel mechanism 21 and thereby travels on the travel lane 15. The pallet crane 20 stores the pallet A onto a shelf board using a transfer unit 22 capable of moving up and down. The transfer unit 22 is able to rotate about a vertical axis. This permits smooth transfer work even if storage racks are disposed on both sides of the crane, as illustrated in FIG. 2. The pallet crane 20 is also capable of picking a pallet A and carrying it to the point of origin, i.e. the pallet station 16.

The case picking crane 30 is equipped with a travel mechanism 31 and thereby travels on the travel lane 15. The case picking crane 30 is also provided with the two independent transfer units 40 capable of moving up and down. Each transfer unit 40 picks one piece of the case B placed on the shelf board 13. The case picking crane 30 primarily picks the case B and is also capable of storing work.

With reference to FIG. 3, the transfer unit 40 includes: a crawler conveyor 41 for coming into contact with the immediate vicinity of a bottom of the case B and transferring the case B; and an extendable adsorbable arm 42 provided with one adsorbable head 43 that exerts suction on a side face of the case B via air pressure. The transfer unit 40 is able to rotate about a vertical axis. As a result, the case picking crane 30 is allowed to pick a case from any of the storage racks that are installed on both sides of the lane. If one of the opposed storage racks is the storage rack with a built-in conveyor 12, the case B is allowed to be transported out.

Figure 4A:
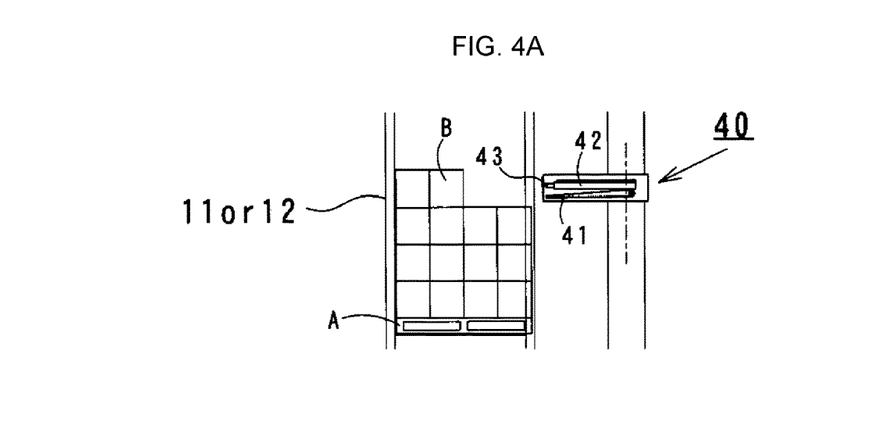
FIGS. 4A to 4G illustrate an example picking motion of the case picking crane according to the present invention.
Figure 4B:
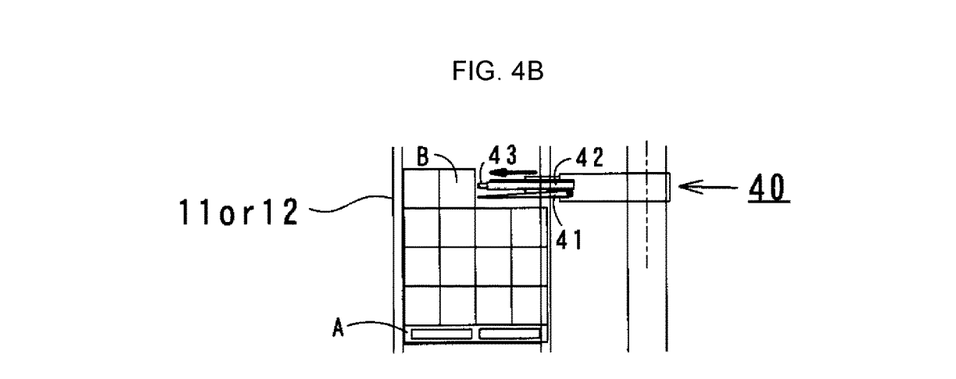
Figure 4C:
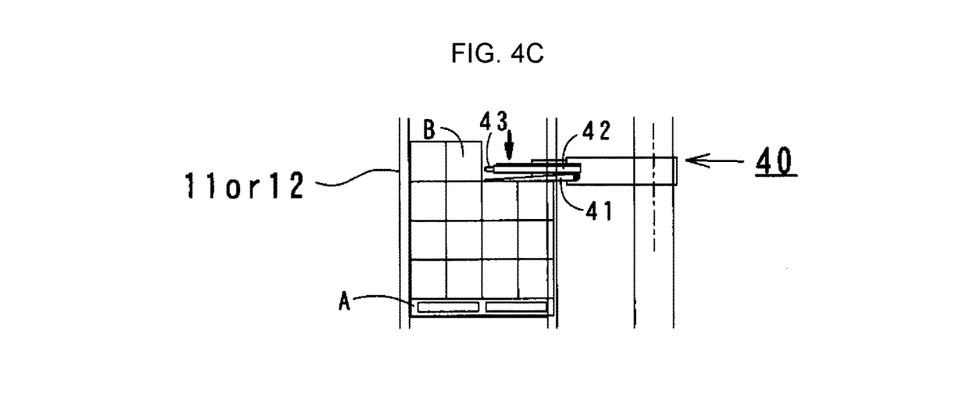
Figure 4D:
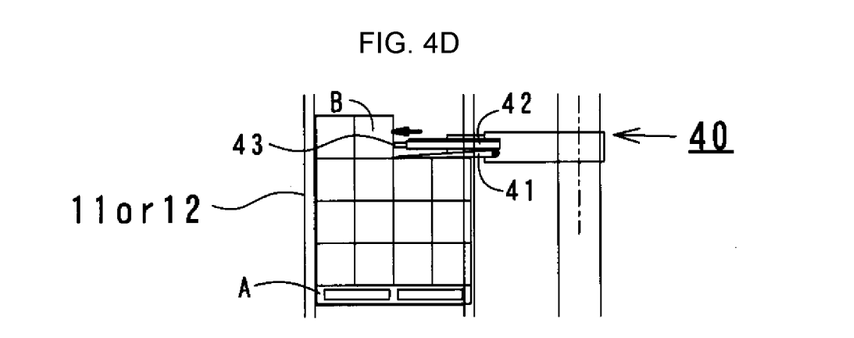
Figure 4E:
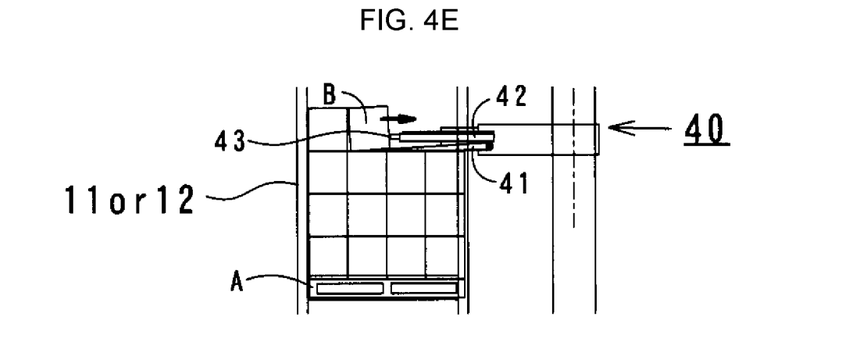
Figure 4F:
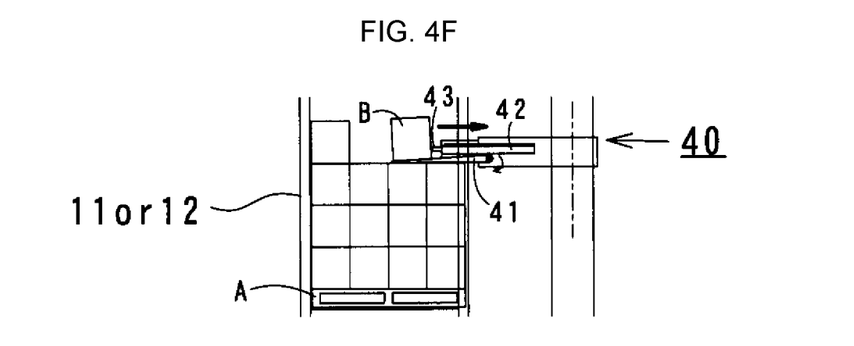
Figure 4G:
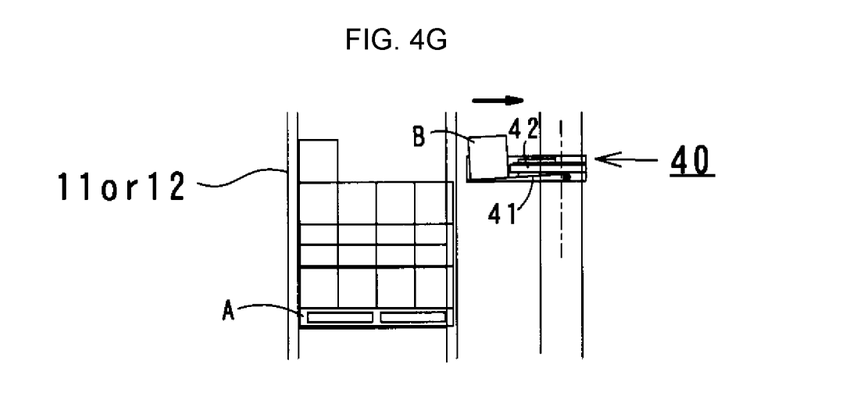

With reference to FIGS. 4A to 4G, a sequential case picking motion of the transfer unit 40 will now be described. As illustrated in FIG. 4A, the case picking crane 30 moves to a case B specified by the computer. In FIG. 4B, the crawler conveyor 41 and the adsorbable arm 42 of the transfer unit 40 head toward the specified case B. As illustrated in FIG. 4C, an undersurface of the crawler conveyor 41 descends to a level of the immediate vicinity of the case B bottom. In FIG. 4D, the adsorbable arm 42 extends forward (leftward in FIG. 4D), presses the adsorbable head 43 against the side face of the case B, and gets it to be suctioned onto the side face of the case B by air pressure aspiration. In FIG. 4E, the adsorbable arm 42 shrinks with the adsorbable head 43 being suctioned onto the case B side face such that the bottom of the case B is put on the crawler conveyor 41. In FIG. 4F, the transfer unit turns the crawler conveyor 41 clockwise as in the figure and gets the adsorbable arm 42 to further shrink (move rightward in FIG. 4F) such that the entire bottom of the case B is placed on the crawler conveyor 41. As illustrated in FIG. 4G, the crawler conveyor 41 and the adsorbable arm 42 move rightward and the case B is stored in a predetermined place of the case picking crane 30.

With reference to FIGS. 5A to 5F, sequential operation of the automated storage and retrieval, system 10 will now be described.

Figure 5A:
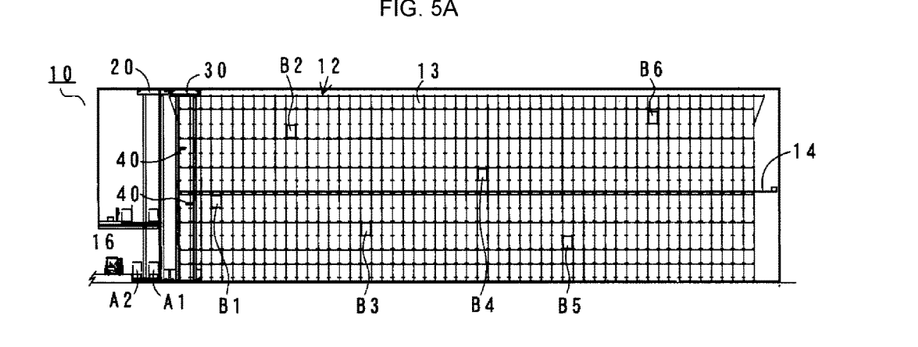
FIGS. 5A to 5F illustrate example operation of the automated storage and retrieval system for pallets and cases according to the present invention.

First, in FIG. 5A, the pallet crane 20 and the case picking crane 30 are on standby at a point of origin, i.e. the pallet station 16. As illustrated in the figure, the pallet crane 20 is disposed on the left and the case picking crane 30 is disposed on the right of an identical travel lane. As a matter of course the pallet crane 20 never overtakes the case picking crane 30 rightward because these apparatuses travel on the same lane. With this disposition being kept during operation, the computer automatically assigns processes of operation based on information about pallets A to be stored and cases B to be picked. To achieve efficiency, these processes are assigned such that operation is conducted while the case picking crane 30 is traveling one way from the point of origin to the endpoint, i.e. the left end to the right end of the lane in the figure. Because of the configuration of the automated storage and retrieval system 10, the case picking crane 30 always goes ahead of the pallet crane 20. Thus, the system 10 searches for any vacant shelf board 13 onto which the pallet crane 20 is to store one of the pallets while being allowed to move inside a range between short of a point to which the case picking crane 30 has traveled and the point of origin. In this way, the pallet crane 20 proceeds with the processes assigned by the system 10. In this embodiment, pallets that are to be stored according to the system's allocation are marked with A1 to A7, whereas cases to be picked and pallets stacked with these cases are marked with B1 to B6.

Figure 5B:
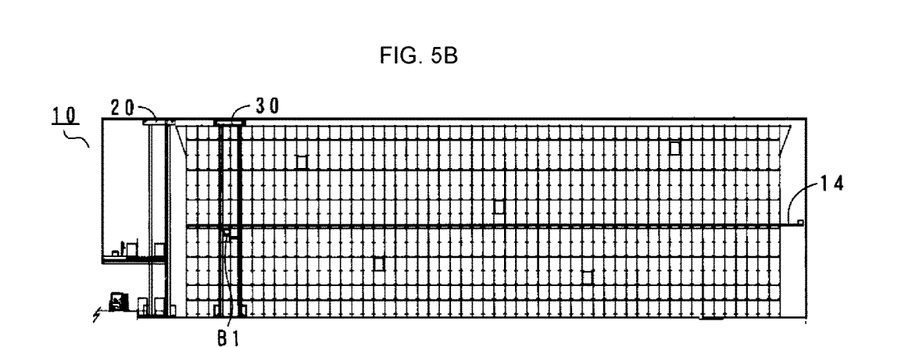

Second, with reference to FIG. 5B, the case picking crane 30 travels and then picks a case B1 using the left-hand side transfer unit 40 according to assignment data.

Figure 5C:
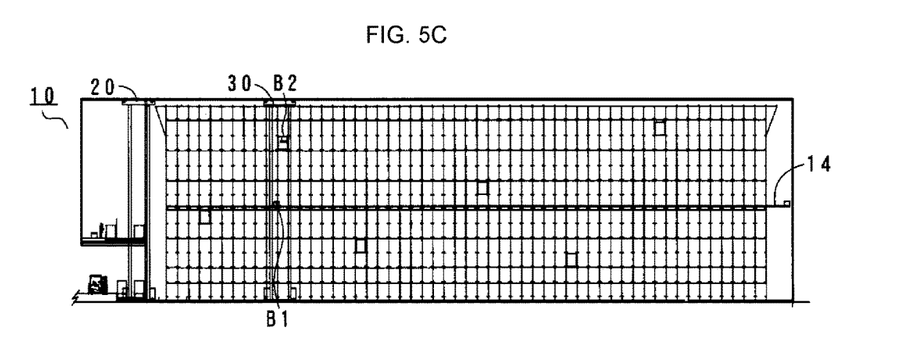

Third, as illustrated in FIG. 5C, the case picking crane 30 travels and then picks a case B2 using the right-hand side transfer unit 40. At this time, the left-hand side transfer unit 40 loaded with the case B1 ascends or descends to the level of the conveyor 14, and transfers the case B1 to the conveyor 14 at the same time when the right-hand side transfer unit 40 picks the case B2. The right- and left-hand side transfer units 40 simultaneously perform picking and transferring. This allows consecutive picking work as opposed to conventional systems where a case picking crane returns to a point of origin and transfers a case B to a conveyor each time the case picking crane completes picking. This new configuration can shorten picking operation time and substantially improve working efficiency.

Figure 5D:
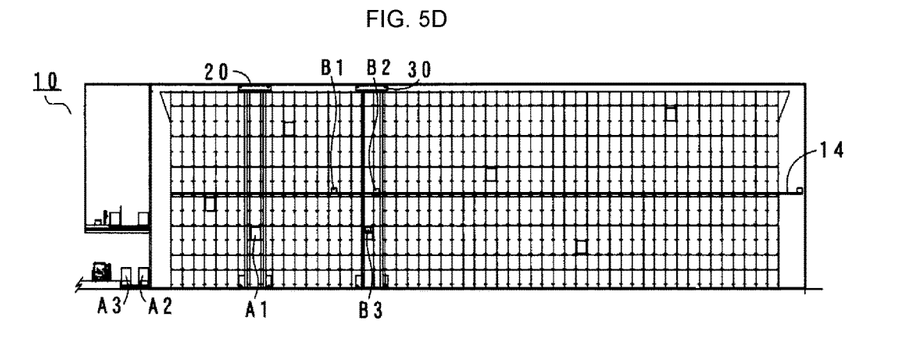

Fourth, with reference to FIG. 5D, as the case picking crane 30 proceeds with picking work in a rightward direction, the case picking crane 30 passes through a vacant shelf board that is assigned in advance for storage of a pallet A1. Then, the pallet crane 20 starts traveling and stores the pallet A1 onto the assigned shelf board. After that, the pallet crane 20 moves to the point of origin to pick a next pallet A2 stationed there.

Figure 5E:
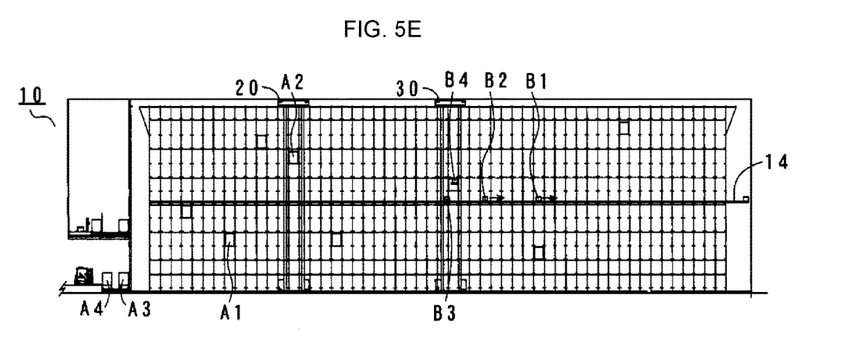

Fifth, with reference to FIG. 5E, the case picking crane 30 always travels ahead of the pallet crane 20 rightward, i.e. toward the endpoint, as with the fourth step, while consecutively picking cases B and transferring them to the conveyor. Meanwhile, the pallet crane 20 stores pallets A onto vacant shelf boards assigned for a movable range.

Figure 5F:
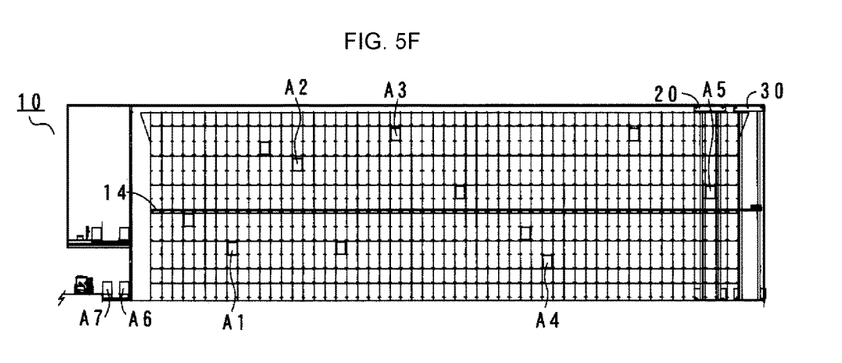

Sixth, finally as illustrated in FIG. 5F, the case picking crane 30 and the pallet crane 20 reach the endpoint. This completes one cycle of case B picking and pallet A storing operation. The case picking crane and the pallet crane return to the point of origin in FIG. 5A and proceed to a next round of operation.

Although no drawing is attached, if a pallet A loaded with a case needs to be picked or a vacant pallet A needs to be collected, the pallet crane 20 can separately perform picking work and carry the pallet A to the pallet station 16, i.e. a point of origin.

A system according to an embodiment of the present invention can offer a picking capacity of around 250 cases per hour, whereas conventional man power picking methods offer a picking capacity of around 50 cases per hour.

An automated storage and retrieval system for pallets and cases according to the present invention allows a pallet crane and a case picking crane to cooperatively operate on an identical lane, and thus enables space-saving and efficient operation in storing pallets and picking cases at automated warehouses such as distribution centers involved in low-volume and high-variety picking.

What is claimed is:

1. An automated storage and retrieval system for pallets and cases, comprising:
   a first storage rack having a plurality of shelf boards in rows and columns, each of the shelf boards being used for storage of a pallet stacked with at least one case;
   a second storage rack with a built-in conveyor, wherein the second storage rack with the built-in conveyor is configured to unload a case, and wherein the built-in conveyor is inserted through the second storage rack at a predetermined level;
   at least one travel lane for allowing a crane to travel parallel to a gap between the first storage rack and the second storage rack that are combined side by side;
   a pallet crane configured to travel on the travel lane and perform tasks including storing the pallet onto any of the shelf boards and picking the pallet from any of the shelf boards; and
   a case picking crane configured to travel on a lane identical to the travel lane that lets the pallet crane travel, the case picking crane being provided with two independent transfer units capable of moving up and down, and each transfer unit being configured to pick one piece of the case placed on any of the shelf boards,
   wherein one of the transfer units of the case picking crane ascends or descends to the level of the conveyor and transfers a picked case to the conveyor at the same time when the other transfer unit of the case picking crane travels to a column for a specified shelf board loaded with a case and picks the loaded case,
   wherein each of the transfer units comprises:
     a crawler conveyor for coming into contact with the immediate vicinity of a bottom of the case and transferring the case; and an extendable adsorbable arm provided with one adsorbable head that exerts suction on a side face of the case via air pressure, and wherein each of the transfer units is able to rotate about a vertical axis.

\* \* \* \* \*